Aug. 3, 1965  W. H. MARTINDALE  3,198,484
SHEET METAL VALVE CONSTRUCTION
Filed Dec. 20, 1962
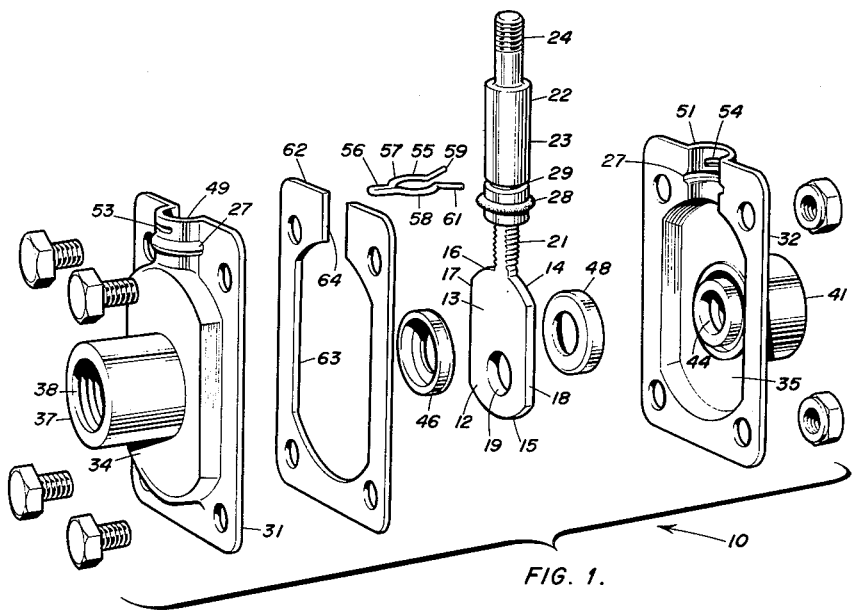
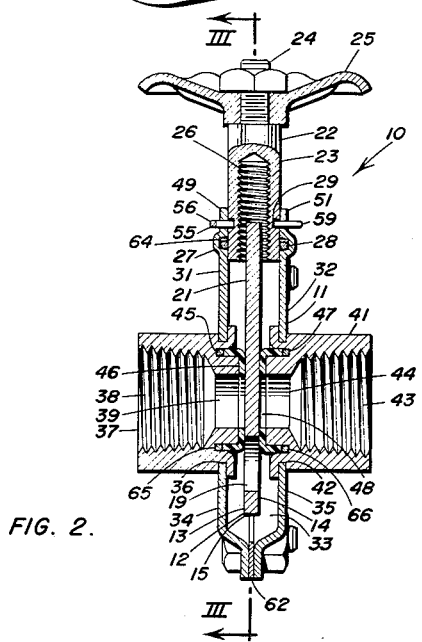
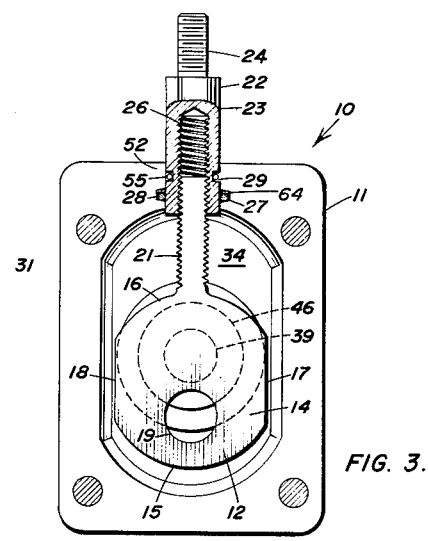
INVENTOR
WILLIAM H. MARTINDALE
BY Norman S. Blodgett
ATTORNEY United States Patent Office 3,198,484
Patented Aug. 3, 1965

3,198,484
SHEET METAL VALVE CONSTRUCTION
William H. Martindale, Northboro, Mass., assignor to Standard Fittings Company, Framingham, Mass., a corporation of Massachusetts
Filed Dec. 20, 1962, Ser. No. 246,165
1 Claim. (Cl. 251—329)

This invention relates to a valve, and more particularly to apparatus arranged to control the flow of fluids by the controlled-aperture method.

With the wider use of valves in liquid and gas applications has come a constant demand for valves which are less expensive and which are less subject to deterioration. Furthermore, peculiar problems are presented when the liquid to be handled by the valve contains fine solids in suspension. In the past, for instance, when such a liquid has been encountered, it has been necessary to use a very expensive type of valve, or to replace less expensive valves at very frequent intervals. Now, replacement of valves in a fluid system is not only expensive in labor and in the cost of the new valve but usually requires that the system be shut down during the replacement of the valve. In many industrial applications this is prohibitive. These and other difficulties experienced with the prior art devices have been obviated in a novel manner by the present invention.

It is, therefore, an outstanding object of the invention to provide a valve which is inexpensive in construction and, yet, is capable of a long life of useful service.

Another object of this invention is the provision of a valve of the gate type in which the danger of the valve becoming inoperative due to deposits of solids and the like is reduced to a minimum.

A further object of the present invention is the provision of a gate valve having a novel and inexpensive actuating means.

It is another object of the instant invention to provide a valve, the major parts of which are formed from sheet metal stampings, so that a very inexpensive readily-constructed device is provided.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is an exploded perspective view of a valve embodying the principles of the present invention;

FIG. 2 is a vertical sectional view of the valve taken in the plane of the centerline of flow of fluid; and FIG. 3 is a transverse vertical sectional view of the valve taken on the line III—III of FIG. 2.

Referring to the drawings, it can be seen that the valve, indicated generally by the reference numeral 10, consists of a body 11 and a gate member 12. The gate member is formed of plate material and is provided with two smooth plane surfaces 13 and 14 which are spaced and parallel to one another. It is provided with a circular bottom edge 15 and a circular top edge 16 joined by straight parallel side edges 17 and 18. Extending through the gate member adjacent the bottom edge 15 is a circular aperture 19. Extending from the top edge 16 is a stem 21. In the preferred embodiment, this stem is wider than the thickness of the material from which the gate member is formed, so that the threads appear only on the edges of the stem but not only on the surfaces which are extensions of the surfaces 13 and 14.

The valve is provided with an actuating member 22 having an elongated cylindrical surface 23. At its upper end the actuating member is provided with a reduced threaded portion 24 provided, in turn, with a handle 25 which, for the purposes of clarity, is shown only in FIG. 2. Into the end of the actuating member opposite the threaded portion 24 extends a dead-end threaded bore 26 which receives the threaded stem 21 of the gate member. Around this last-named end the cylindrical surface of the housing is provided with a first annular groove 27 in which is mounted a Teflon O-ring 28 and a backup ring 64. Spaced a short distance away from the groove 27 and formed on the actuating member 22 is another annular groove 29 whose purpose will be explained more fully hereinafter.

The body 11 consists of a first body member 31 and a second body member 32 both formed of sheet metal stampings. Each of the body members is formed with a basin-shaped protrusion 34 and 35 in its central portion, the two defining an inner chamber 33. Outside of the basins 34 and 35 these body members 31 and 32 are generally flat sheet metal plates which are joined together by the provision of suitable apertures at the corners and the provisions of nuts and bolts. The first body member 31 has been provided, in the center of its basin, with an aperture 36 into which is inserted an inlet port member 37 provided with a threaded bore 38 which terminates in a reduced inlet port 39 having substantially the same diameter as the aperture 19 of the gate member. The inlet port member is fastened to the first body member 31 by swaging around the iner edge of the aperture 36 in such a manner as to provide a firm pressure-type joint. Similarly, the second body member 32 is provided with an outlet port member 41 which is swaged in an aperture 42 formed in the basin 35; this outlet port member is provided with a tapped bore 43 which terminates inwardly in an outlet port 44 aligned with the inlet port 39 and of the same diameter. The inner portion of the inlet port member 37 is provided with an axial groove 45 which is concentric with the inlet port 39 and in which rests the flange of a Teflon seal 46. This seal, as is evident in the drawing, is more or less cup-shaped having an axial flange which fits in the groove and a radial portion which surrounds the inner edge of the inlet port 39. In the bottom of the groove 45 behind the flange of the seal 46 resides an O-ring 65. Similarly, the outlet port member 41 is provided with an axially-facing groove 47 in which is locked the flange of another cup seal 48 having behind it an O-ring 66. The dimensions of the valve are selected so that the seals 46 and 47 rub against the surfaces 13 and 14, respectively, of the gate member 12. Stamped into the first body member is a neck portion 49 having a semi-cylindrical inner surface, while a similar neck portion 51 is stamped in the second body member 32 each neck having one-half of the groove 27. These neck portions combine, when the body members are assembled, to provide a bore 52 in which resides the actuating member 22, the seal 28 fitting tightly around the member 22 to provide for sealing. The neck portion 49 is provided with an elongated slot 53 while a similar matching slot 54 is punched through the neck portion 51. A locking member 55 in the form of a wire clip extends through the slot 53 around the groove 29 of the actuating member and through the slot 54 to lock the actuating member against axial movement while permitting rotative movement. Basically, the locking member consists of a U-shaped loop 56 which extends outwardly through the slot 53, opposed circular portions 57 and 58 which reside in the groove 29, and outwardly-diverging legs 59 and 61 which extend through the slot 54. A suitable fiber gasket 62 is mounted between the first and second body members and is provided with an oval-shaped center opening 63 having the shape of the periphery of the chamber 33 and with an outwardly-extending opening 64 in the vicinity of the neck portions 49 and 51.

The operation of the invention will now be readily understood in view of the above description. To begin with, the assembly of the valve is more or less self evident from an examination of FIG. 1. It should be noted, however, that the locking member 57 is first assembled with the first body member 31 by the insertion of the loop 56 through the slot 53. Then, the actuating member 22 is laid in the neck portion 49. After the gasket has been inserted, the second body member 32 is put in place, the slot 54 being impaled on the legs 59 and 61 of the locking member.

It can be seen, then, that this construction is very inexpensive because the body is made up of sheet metal stampings instead of solid metal parts, as has been the practice in the past. The major solid metal parts, that is to say, the gate member 12, the actuating member 22, the inlet port member 37, and the outlet port member 41 are all readily manufactured from easily obtained materials. In operation, the rotation of the actuating member 22 by a handle 25 or other means provides an up-and-down movement of the gate member carrying the aperture 19 from a position when it is aligned with the inlet port 39 and the outlet port 44 to a lower position as shown in FIG. 2 wherein the aperture 19 is well below these ports, and, of course, fluid cannot flow through the valve. It is interesting to note that the lower portion of the chamber 33 into which the gate valve 12 moves in the closed condition of the valve is not accessible to the fluid during either the open or closed condition of the valve. This means that fluid will not flow into this area nor in the case of fluids carrying solids in suspension will solids be deposited in this area. This obviates the difficulty of accumulated solid material which eventually prevents the gate member from moving downward to close the valve. This is particularly important where the valve is open and on the line for long periods of time, and, yet, must be closed on very short notice. Under these conditions solids may accumulate in the lower part of such chambers and prevent closing of the gate member when it is most necessary to close it. The rubbing of the seals 46 and 47 along the surfaces 13 and 14 of the gate member provide for adequate sealing and location of the gate member and they assure that fluid cannot flow into the lower part of the chamber in either of the extreme positions of the gate member.

It will be understood from examination of the invention that the valve may be used as both valve and union in combination. The pipe ends 37 and 41 and the body 31 and 32 remain in place on the line, permitting the removal of the center parts of the valve for maintenance without removing the entire valve from the line. The parts may be easily removed by the removal of the four bolts. An alternate construction of the stem permits a rapid open-close movement in a vertical direction when the valve is operated by a vertical cylinder or other remote control actuator. The pipe ends 37 and 41 may be formed as socket-weld fittings, as solder-type fittings, as butt-weld fittings, and possibly, as tube fittings to fit the particular use. It should be noticed that the valve is constructed so that there is no metal-to-metal contact of sliding members. In addition, flanges, of course, could be supplied in place of the threaded pipe ends 37 and 41; the valve may be readily manufactured in suitable lengths for various applications. The union type of construction permits the removal of the center parts of the valve to change from a screw-type operation, as described above, to the quick-open-close operation as a plunger.

An alternate method of construction would permit the use of the valve under high-pressure high-temperature applications. This alternate construction would use two or more of the body members 31 laminated together for a double or higher number of thicknesses. This would be a sandwich-type of construction welded, soldered, or fused, together; this construction would be more essential to a valve using a flange pipe end construction where greater strength or rigidity is required. Furthermore, it is noted that the valve is a two-way valve; that is to say, it can be installed in the line so that flow takes place in either direction. The O-rings in the seats 46 and 47 are suitably sized to prevent leakage of fluids around the seats and to exert a backward force against the sliding gate 15 to insure proper contact between the gate and the seats. Although the O-ring 28 is shown as the primary sealing device around the stem, the valve is not necessarily limited to use with an O-ring; a packing gland made up of a screwed or bolted bonnet and packing could be used in place of the O-ring.

Some of the advantages of the present valve may be listed as follows:

It is a full ported valve, there is low pressure drop through the valve, there is very little turbulence, there is a low break-away torque due to the fact that there is no metal contact, there is a low operating torque due to the Teflon seals, and the valve is excellent for remote operation due to the low break-away torque so that a small size operator may be used.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

A valve, comprising
 (a) a first body member formed as a sheet metal stamping,
 (b) a second body member formed as a sheet metal stamping,
 (c) an inlet port member secured to the first body member,
 (d) the outlet port member secured to the second body member,
 (e) a gate member having spaced parallel surfaces and an aperture therethrough,
 (f) an actuating member of cylindrical form connected by threaded means to the gate member for bringing about sliding movement of the gate member between the first and second body members, each body member having a stamped semi-cylindrical neck portion which embraces the actuating member, and
 (g) locking means permitting rotative but prohibiting axial movement of the actuating member in the neck portions, an aperture extending through each body member in the neck portion and the actuating member being provided with an annular groove adjacent these apertures, the said locking means consisting of a clip which extends inwardly through one of the apertures, lies in the groove of the actuating member, and extends outwardly through the other aperture.

References Cited by the Examiner

UNITED STATES PATENTS

| | | | |
|---|---|---|---|
| 516,658 | 3/94 | Richards | 29—157.1 |
| 912,082 | 2/09 | Dahlberg | 251—269 XR |
| 1,964,509 | 6/34 | Fina | 251—367 XR |
| 2,375,980 | 5/45 | Charme | 251—269 |
| 2,868,495 | 1/59 | Lucas | 251—86 |
| 3,013,769 | 12/61 | Volpin | 251—269 XR |
| 3,052,963 | 9/62 | Williams | 251—329 XR |

M. CARY NELSON, *Primary Examiner.*

LAVERNE D. GEIGER, *Examiner.*